Nov. 1, 1960 P. H. SHERRON 2,958,402

TELEPHONE BOOTH WITH VIBRATION ABSORBING BASE STRUCTURE

Original Filed Sept. 3, 1952 4 Sheets-Sheet 1

INVENTOR.
PERCIVAL H. SHERRON
BY
[signature]
ATTORNEYS

INVENTOR.
PERCIVAL H. SHERRON
BY
[signature]
ATTORNEYS

TELEPHONE BOOTH WITH VIBRATION ABSORBING BASE STRUCTURE

Original Filed Sept. 3, 1952

4 Sheets-Sheet 3

INVENTOR.
PERCIVAL H. SHERRON
BY
[signature]
ATTORNEYS

INVENTOR.
PERCIVAL H. SHERRON
BY
[signature]
ATTORNEYS 2,958,402
Patented Nov. 1, 1960

2,958,402

TELEPHONE BOOTH WITH VIBRATION ABSORBING BASE STRUCTURE

Percival H. Sherron, Jamaica, N.Y. (% Sherron Metallic Corp., 1201 Flushing Ave., Brooklyn 37, N.Y.)

Original application Sept. 3, 1952, Ser. No. 307,630, now Patent No. 2,912,073, dated Nov. 10, 1959. Divided and this application Apr. 16, 1956, Ser. No. 578,234

2 Claims. (Cl. 189—2)

This invention relates to an improved telephone booth of the so-called stall type. More particularly, it relates to details of construction of the booth and elements used in the assembly thereof.

This invention represents further improvements in the booth structure and is a division of my copending patent application Serial No. 307,630, filed September 3, 1952, now Patent No. 2,912,073.

It is an object of this invention to provide a telephone booth having structural elements which can be fabricated easily and rapidly and which can be assembled to form a rigid structure.

It is a further object of this invention to provide a telephone booth comprising a minimum number of parts and of interlocking construction.

It is a further object of this invention to provide a booth having improved acoustic properties.

In general, the telephone booth in accordance with this invention comprises a base, corner posts, wall panels, a lintel, a door assembly, and a ceiling structure. The telephone booth also includes miscellaneous other structural elements which will be described.

The foregoing objects of the invention will become apparent from the following description when read in conjunction with the accompanying drawings, in which.

Figures 6, 7, 8, 9:
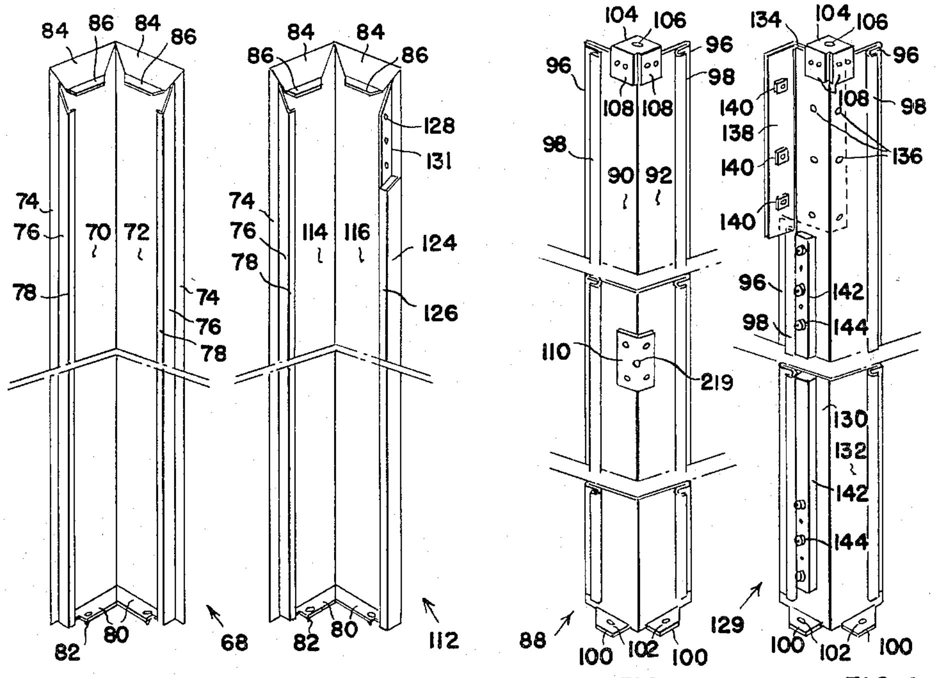
Figure 6 is a perspective view of an outer rear corner post.
Figure 7 is a perspective view of an outer front corner post.
Figure 8 is a perspective view of an inner rear corner post.
Figure 9 is a perspective view of the inner front right-hand corner post.

The telephone booth base includes a lower frame 2 and an upper frame 4. The lower frame includes at its lower edge an inwardly extending flange 6. The upper edge of the lower frame is formed to provide an internal channel 8 opening upwardly. The upper portion 4 of the base is formed with its upper edge providing an inwardly extending flange 10 and having adjacent to its lower edge an internal channel 12 opening downwardly. The channel 8 of the lower base section and the channel 12 of the upper base section face one another and are adapted to retain a strip 14 of a yielding material such as rubber or a soft fibrous material adapted to absorb vibrations transmitted from the surface on which the booth rests and to prevent the passage of these vibrations upwardly into the booth structure.

A strap 16 extends from the front to the rear of the booth and abuts against the inwardly extending rear lower flange 6. A floor plate 18 is attached to the inwardly extending flanges 6 and to the strap 16. Cemented onto the floor plate 18 is a sheet of linoleum or other suitable floor covering 20. A linoleum edging 22 is attached to the front portion of the lower surface of the floor plate 18 and at its ends is attached to inwardly turned flanges 23 of the lower base assembly.

The upper flange 10 of the upper portion of the base is provided, adjacent to each of the four corners of the booth, with bores 24. Straps 26 are secured to the underside of the flanges 10 adjacent to each corner of the booth. The straps are provided with bores 30 in alignment with the bores 24 in the flange 10. The central portions of each of the straps 26 containing the bores 30 are spaced below the flange 10 and the end portions of each of the straps 26 are bent upwardly and are attached to the flange 10 preferably by welding.

In the rear left-hand corner of the booth base, as viewed from the front of the booth, there is provided a seat support structure including a triangularly shaped plate 32 which is adapted to rest upon and be connected to the floor plate 18. The plate 32 is formed with an upwardly extending flange 34 which has tab portions 36 extending from each end thereof and attached to the side wall 2 of the lower portion of the booth base. A bar 38 is attached to the upper surface of the plate 32. A plate 40 is positioned above the plate 32. The upper surface of the plate 40 is attached to the lower surface of the straps 26 in the left rear corner of the booth and is provide with bores 41 in alignment with the bores 30 in the straps 26. The plate 40 is provided with a downwardly extending flange 42 which is provided at its ends with tabs 44 which are adapted to be joined to the side wall of the upper portion 4 of the base. The plate 40 is provided with a bore 46. Attached to the lower surface of the plate 40 is a spring hinge arrangement. One leaf 48 of the hinge is attached to the plate 40 and the other leaf 50, which is adapted to bend downwardly, partially overlaps the bore 46 and has attached to it a metal disc 51 which covers the bore 46 when in an upward position as shown in Figure 3.

Figures 1, 3, 4, 5:
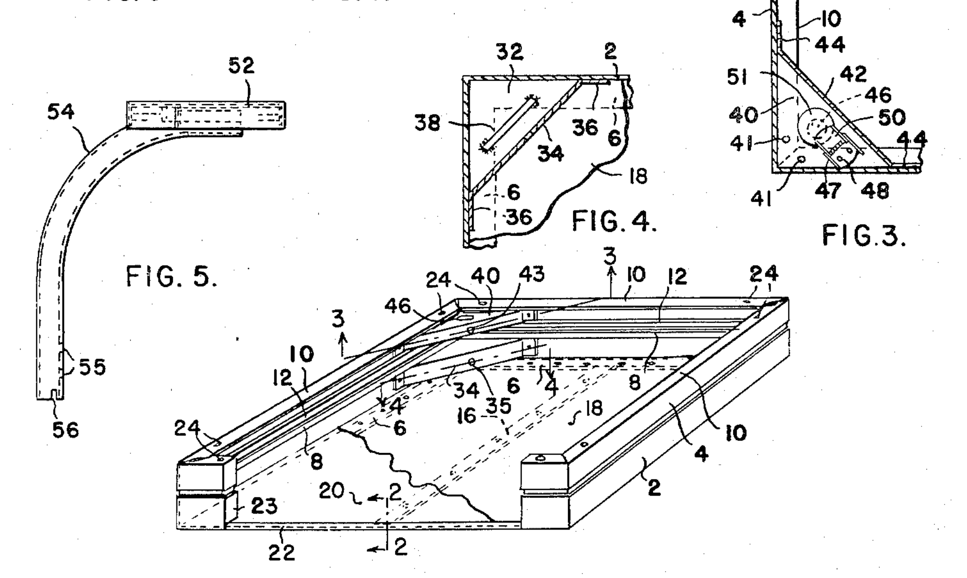
Figure 1 is a perspective view of the booth base.
Figure 3 is a transverse section of a portion of the base taken on the trace 3—3 of Figure 1.
Figure 4 is a transverse section of a portion of the base taken on the trace 4—4 of Figure 1.
Figure 5 is an elevation of the seat and seat support arm employed within the booth.
Figure 2:
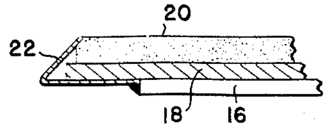
Figure 2 is a vertical section of a portion of the base taken on the trace 2—2 of Figure 1.

In Figure 5 there is shown a seat assembly including a seat member 52 and a curved pipe support 54 the upper end of which is attached to the lower surface of the seat 52. The lower end of the seat support 54 is provided with a notch 56. The lower end of the seat support 54 is adapted to pass through the bore 46 in the plate 40 and the notch 56 is provided to engage the bar 38 attached to the plate 32. When the seat support 54 passes through the bore 46, the leaf 50 of the spring hinge and the disc 51 will be deflected downwardly and out of the way. The flange 42 of plate 40 and the flange 34 of the plate 32 are each provided with at least one bore 43 and 35, respectively. The seat support pipe 54 is provided at its lower end with a pair of bores 55. The bores 55 are tapped and are adapted to receive bolts passed through the bores 43 and 35 for further securing the seat assembly in position.

The booth includes four corner post assemblies 60, 62, 64 and 66. Each of the corner post assemblies comprises an inner corner post and an outer corner post. In Figure 6 there is shown generally at 68 a typical rear outer corner post. This post is formed from a single sheet of metal and includes a pair of vertically extending panels 70 and 72 formed at right angles to each other and forming the outer surfaces of the corner of the booth. The outermost edges of the vertically extending panels 70 and 72 are each provided with a portion 74 bent backwardly upon the inner surface of its associated panel. Extending from and at right angles to each of the portions 74 is a flange 76, and extending from and at right angles to each of the flanges 76 is a flange 78. The flange 78 associated with panel 70 is parallel thereto and extends toward the panel 72 and the flange 78 associated with the panel 72 is parallel thereto and extends toward the panel 70.

At the lower end of each of the panels 70 and 72 there is an inwardly extending flange 80 to which there is secured a downwardly extending pin 82.

At the upper end of each of the panels 70 and 72 there is provided an inwardly and downwardly extending flange 84. The flange 84 terminates in a horizontal inwardly extending flange 86.

The outer post structure described in connection with Figure 6 is typical of the two rear outer post structures. In Figure 7 there is shown generally at 112 the right-hand front outer post. This post includes a pair of vertically extending panels 114 and 116. The panel 114 on the left side of the post, as viewed in Figure 7, has flanges 74, 76 and 78 identical to flanges 74, 76 and 78 on the outer post shown in Figure 6. These flanges, as will be hereinafter described, are adapted to provide, in conjunction with the mating inner post structure, a recess for the reception of a wall panel.

Adjacent to the vertically extending panel 116 is a flange 124 at right angles thereto and extending inwardly therefrom. Extending at right angles to the flange 124 is a flange 126 extending toward the panel 114 and parallel to the panel 116. The upper portion of the flange 124 is formed with a recessed portion 131 which is provided with bores 128 and is adapted to mount a door lintel 133 shown in Figure 13. The upper ends of the panels 114 and 116 are formed with flanges identical to those described as 84 and 86 in the post shown in Figure 6 and the lower ends of the panels 114 and 116 are formed with flanges 80 which contain pins 82 identical to those described in connection with the post shown in Figure 6. The post shown in Figure 7 is an outer front right-hand post and the outer front left-hand post, not shown in detail, is identical to it with the exception of being reversed, that is, if viewed from the interior of the post, the recessed portion 131 would be on the left side of the post as viewed rather than on the right side as shown in Figure 7.

In Figure 8 there is shown generally at 88 the inner right-hand rear corner post. This post is formed from a single sheet of metal and includes a pair of vertically extending panels 90 and 92. The outward edges of each of the panels 90 and 92 are provided with a portion 96 bent backwardly upon its associated panel and terminating in a channel formation 98. The clearance within the channel formation 98 is such as to admit the flange 78 of an outer post, as shown in Figure 6, when the posts are assembled as will be hereinafter described.

Each of the vertically extending panels 90 and 92 is formed at its lower end with inwardly extending flanges 100 and each of the flanges 100 is provided with a bore 102 adapted to receive the pins 82 of the outer post assemblies when the post assemblies are assembled with a floor assembly as will be described.

The inner post, shown in Figure 8, is provided with a ceiling structure support which is a horizontal plate 104 including a central bore 106 and a pair of downwardly extending flanges 108 on planes at right angles to each other and adapted to be joined to the vertically extending panels 90 and 92 by welding, riveting or other suitable means. A pad 110 is attached to the outside surface of the inner right-hand rear corner post in the lower portion thereof and is adapted to support the lower end of the phone mounting post as will be hereinafter described.

In Figure 9 there is shown generally at 129 the front right-hand inner post assembly. This post includes a pair of vertically extending panels 130 and 132 at right angles to each other. The edges of each of the panels are formed with a bent back flange 96 terminating in a channel 98 identical to the formation of the post described in connection with Figure 8. The upper portion of the panel 130 is partially cut away and in place of the bead and channel arrangement 96 and 98 there is provided a Z-section plate 134 which is attached to the panels 130 and 132, as indicated at 136, by rivets, spot welds or other suitable means and provides an outstanding flange 138 to which nut retainers 140 are attached. When the right-hand front inner post, shown in Figure 9, is assembled with the right-hand front outer post, shown in Figure 7, bores through the plate 138 in alignment with the nut retainers 140 on the inner post are adapted to align with the bores 128 in the recess 131 in the outer post. The complete post assembly will be hereinafter described more fully.

To the upper ends of the panels 130 and 132 there is attached a ceiling support plate 104 having downwardly extending flange portions 108 identical to that described in connection with Figure 8, and the lower ends of the panels 130 and 132 are provided with the outstanding flanges 100 which are provided with bores 102 identical with those shown in Figure 8.

Also attached to the vertically extending panel 130 is a reinforcing strip 142 which supports nut retainers 144. The reinforcing strip 142 and the vertically extending panel 130 are provided with bores in alignment with the nut retainers 144 for the passage of bolts which attach the hinges mounting the booth doors shown at 232 in Figure 13. The doors and the method of mounting the doors will be more fully described hereinafter. The front left-hand inner post assembly is the reverse of that shown in Figure 9 and does not include a door hinge mounting strip 142.

Figures 15, 16, 17, 18:
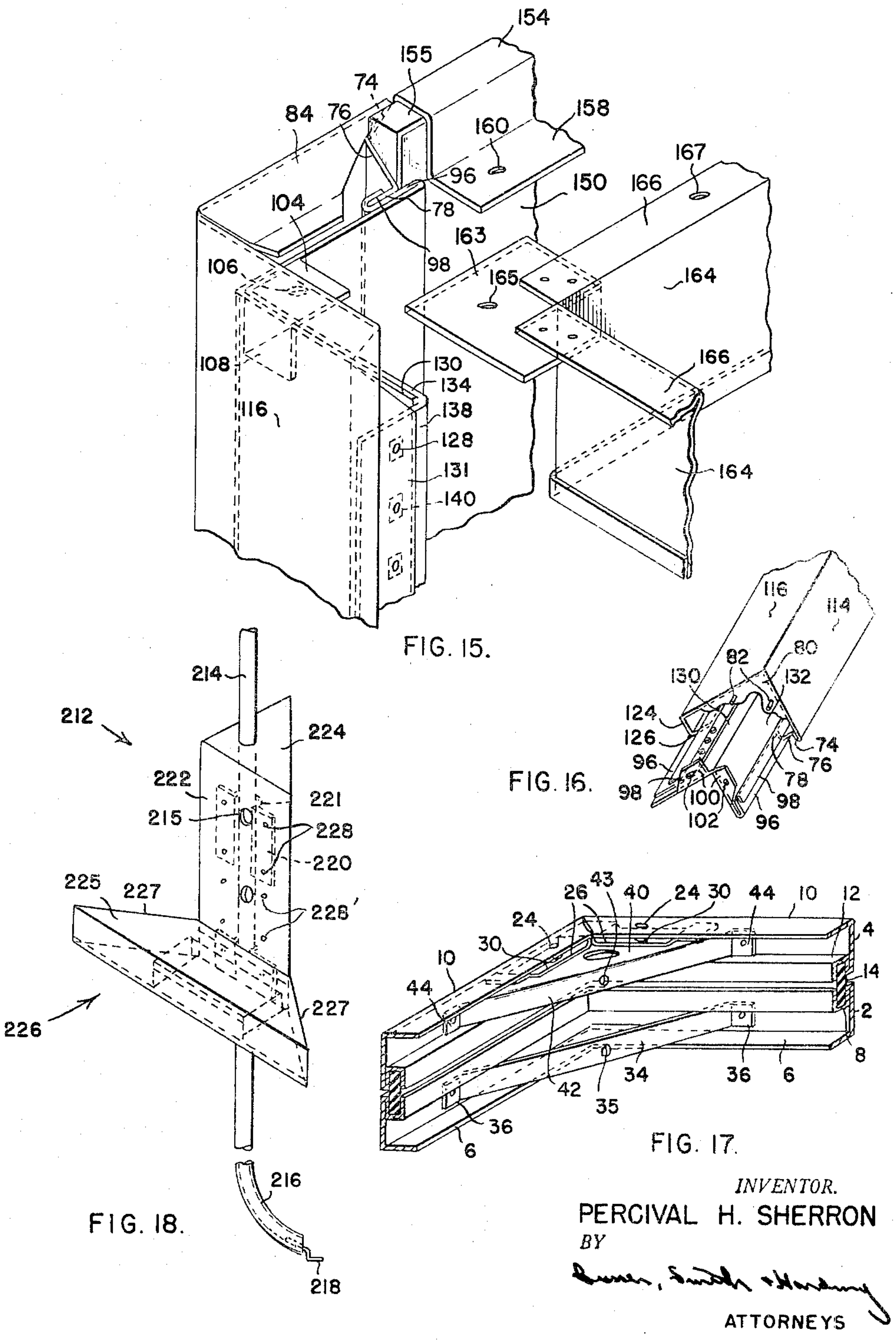
Figure 15 is a perspective view showing the upper portion of one corner of the telephone booth in partially assembled form.
Figure 16 is a perspective view showing the lower end of a partially assembled corner post.
Figure 17 is an enlarged perspective showing of a portion of the floor assembly shown in Figure 1.
Figure 18 is a fragmentary showing of the telephone instrument mounting means.

Figure 16 shows the outer post of Figure 7 and the inner post of Figure 9 in the process of assembly. It will be noted that the flange 78 is adapted to be retained within the channel 98, and that the flange 96 of the inner post assembly, the flange 74 of the outer post assembly and the flange 76 of the outer post jointly provided a channel shaped recess which is adapted to receive the booth side panel for the right-hand side of the booth which is identical to the side panel 148 shown in Figure 13 in the left side of the booth and will be described in detail in connection with Figure 12. The outer post panel 116 is provided with flanges 124 and 126. The flange 126 is adapted to nest within the channel 98 on the inner post and the flange 124 provides a flat surface against which the edge of the booth doors may abut as will be described.

The pins 82 affixed to the flanges at the lower end of the outer post are adapted to pass through the bores 102 in the flanges at the lower end of the inner post. The flanges 100 of the inner post are adapted to be passed between the straps 26 of the floor assembly and the upper flange 10 of the floor assembly. The flanges 80 at the lower end of the outer post are adapted to rest upon the flange 10 of the base structure with the pins 82 passing through the bores 24 in the flange 10. When the pins 82 are passed through the bores 24 in the flange 10, the bores 102 in the flange 100 and the bores 30 in the straps 26, they will lock the corner post assembly together and in position with respect to the base structure. This connection between the corners of the base structure and the lower ends of the corner post assemblies is typical for each of the four posts of the booth.

The booth is provided with two side and one rear panel. A typical panel is shown at 148 in Figure 12. The panel is a rectangular member which may be either of sheet metal construction or formed from a single piece of fibrous or other suitable sound absorbent material. The panel assembly shown is formed from a rectangular inner panel 150, a rectangular outer panel 153 and a supporting frame 155 extending around and joining the periphery of the inner and outer panels. Affixed to the lower edge of the panel assembly is a channel 152 having upstanding legs engaging the sides of the panel. The channel 152 is a length shorter than the width of the panel, thereby leaving at the end of the channel 152 a clearance indicated generally at 162 equal to the depth of the channel formed by the flanges 74, 76 and 96 shown in Figure 16.

A channel 154 is attached to the upper edge of the panel assembly. On the outside of the panel assembly the channel is provided with a downwardly extending flange 156. The inside downwardly extending flange of the channel 154 is provided with an inwardly extending horizontal flange 158 which is provided with bores 160. The channel 154 is also shorter than the width of the panel assembly to permit the panel to nest in the post assemblies at its upper end in the manner previously described in connection with its lower end.

Figures 10, 23:
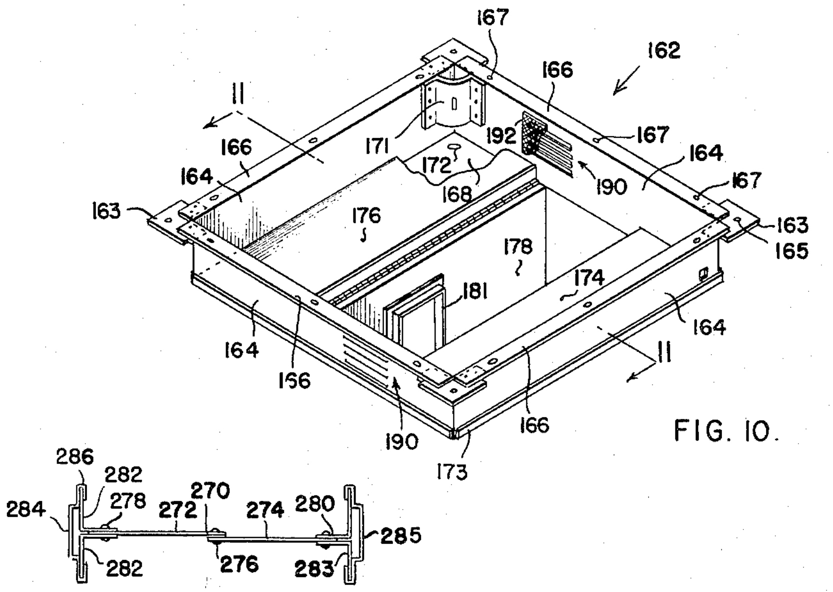
Figure 10 is a perspective view of a portion of the ceiling structure.
Figure 23 is a plan view of the apparatus shown in Figure 22.

The booth ceiling assembly includes a ceiling pan assembly shown generally at 162 in Figure 10. The pan assembly includes four vertical side walls 164 having flanges 166 extending horizontally outwardly from the upper edges thereof. Each of the flanges 166 is provided with bores 167 adapted to mate with the bores 160 in the side panel assemblies previously described. A pan 168 having upturned flanges 173 is adapted to fit against the lower edge of the side walls 164 and to provide a bottom closure therefor. The flanges 173 are attached to the outer surfaces of the side walls 164. The pan 168 is provided with a hinged portion 170 extending transversely of the ceiling pan assembly. The pan 168 is also provided with a bore 172. Covered sheets of suitable sound deadening material 174 and 176 are positioned upon the inner surface of the pan 168 and a sheet of sound deadening material 178 is affixed to the inside surface of the hinged portion 170 of the pan 168.

Generally centrally mounted in the hinged portion 170 is a ceiling light assembly indicated generally at 180. The ceiling light assembly includes a fixed frame 181 which is attached to the hinged portion 170 of the ceiling structure. A glass retaining frame 185 retains a glass plate 184 and is pivotally mounted to the fixed frame 181 by means of the pivots 187. A screw 182 is adapted to enter a bracket 183 which is mounted on the fixed frame 181 and secures the pivotally mounted frame 185 in closed position with respect to the fixed frame 181. A spring latch 186 is provided in order to secure the ceiling hinged portion 170 in closed position by engagement with the edge 188 of the sheet 174. When it is desired to open the ceiling hinged portion 170, access to the latch 186 may be gained by the removal of the screw 182 which permits the glass retaining frame 185 to be pivoted on the pivot pins 187 thereby providing access for a person to reach in through the fixed frame 181 to the interior of the ceiling structure in order to release the latch 186.

The side walls 164 of the ceiling pan assembly are provided with louvers 190 in order to permit ventilation of the space within the ceiling assembly. Screens 192 are provided against the interior of the louvers 190 to prevent the entrance of insects into the ceiling chamber. The ceiling chamber is covered with a cover plate 194 which is provided with downwardly extending flanges terminating in outwardly extending flanges 196. The outwardly extending flanges 196 are provided with bores which are adapted to align with the bores 160 in the side panel flanges and the bores 167 in the ceiling pan flanges in order that the ceiling assembly may be fastened together and in position by means of bolts 198.

The hinged ceiling structure is highly desirable when the telephone booth is installed in a location where access to the top of the booth cannot be had. To provide access for electrical and telephone installation from inside of the booth under such conditions an access opening 193 is provided. An access cover plate 195 is employed to cover the access opening from the underside thereof. The access plate 195 may be affixed to the cover plate 194 by means of bolts 199 passing through aligning bores in the access plate 195 and the cover plate 194 and in engagement with nuts 197 affixed to the upperside of the cover plate 194.

Figure 11:
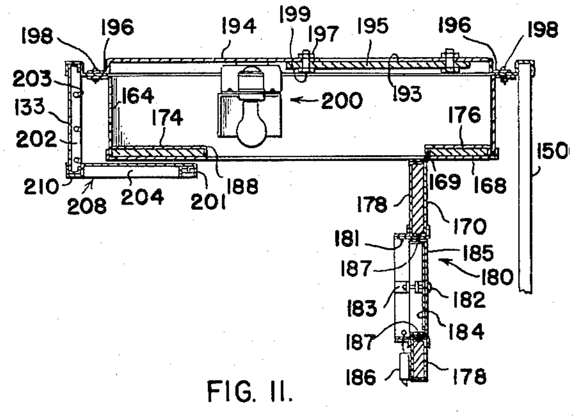
Figure 11 is a vertical section of the ceiling structure taken from the front to rear of the booth.

A ceiling light assembly indicated generally at 200 in Figure 11 may be supported from the ceiling cover plate 194 in a conventional fashion and provides a source of light which, passing through the glass plate 184, will provide illumination for the interior of the telephone booth. There may be additionally provided, if desired, a small ventilating fan which may be positioned within the ceiling assembly adjacent to one of the louvers to induce the circulation of air through the ceiling assembly when the lamp indicated at 200 is energized.

Gusset plates 163 are attached to the ceiling pan flanges 166 at each of the four corners of the ceiling structure. Each of the gusset plates are provided with a bore 165 which is adapted to be in alignment with the bore 106 in the plates 104 affixed to the upper ends of each of the inner posts when the booth is assembled. A bracket member 171 is provided in the left rear corner of the ceiling structure above the bore 172 and is adapted to receive the upper end of a telephone mounting column passing upwardly through the bore 172 in the ceiling pan 168 as will be described.

Attached to the lower edge of the door lintel 133 is an upper door track mounting bracket 204. This bracket extends inwardly from the lower edge of the lintel and is attached thereto by means of a channel 210. Supported on the inner edge of the bracket is the upper door track 201 which guides the upper portion of the free end of the door assembly as will be described. The track extends in a diagonal manner from an inward position, as shown in Figure 11, which is adjacent to the right-hand front door post to a position immediately back of the lintel 133, as indicated by the arrow 208, adjacent to the left-hand front post. The ends of the lintels 202 are provided with slots 203 for the reception of bolts which are adapted to engage nuts in retainers in the adjacent posts such as are shown at 140 in Figure 9 and which support the lintel.

When the inner post shown in Figure 9 is assembled to the outer post shown in Figure 7, the assembly will be that of a right-hand front post. Figure 15 shows the upper end portion of an assembled left-hand front post which is the reverse of the right-hand front post. The figure shows the flange 131 of the outside post in engagement with the flange 138 of the inside post and the alignment of the bores 128 in the outside post with the bores and nut retainers 140 on the inside post providing for the lintel mounting.

When the inner and outer posts are assembled, the flange 78 of the outer post is nested within the channel 98 of the inner post and the inner and outer posts thereby form a side panel retaining channel bounded by the flanges 74, 76 and 96. The frame 155 of a side panel nests within this channel and the channel member 154 affixed to the top edge of the side panel terminates adjacent to the outermost edges of the flanges 74 and 96.

There is also shown in Figure 15 a corner of the ceiling pan assembly in disassembled relation with the corner post and side panel assembly. It will be evident that, upon assembly, the plate 163 of the ceiling pan is adapted to rest upon the plate 104 extending inwardly from the top of the inner corner post and the flange 166 of the ceiling pan is adapted to rest upon the flange 158 of the side panel assembly. When the parts are thus assembled, the bore 165 in the ceiling pan plate 163 is in alignment with the bore 106 in the corner post plate 104. These parts may then be fastened together by a bolt or other suitable means. Similarly the bores 167 in the flanges 166 of the ceiling pan assembly are adapted to be in alignment with the bores 160 in the flange 158 attached to the side panel assembly. The ceiling cover plate 194, shown in Figure 11 and not shown in Figure 15, is at this time placed in position upon the ceiling pan. The cover plate is provided with outstanding flanges 196 which are in turn provided with bores which are adapted to align with the bores 167 in the ceiling pan and with the bores 160 in the side panel flanges. Bolts or other suitable fastening means may be passed through these aligning bores in order to join the ceiling cover plate, the ceiling pan and the side panel flanges together in the manner previously described in connection with Figure 11.

Figures 12, 13, 14, 19, 20, 21:
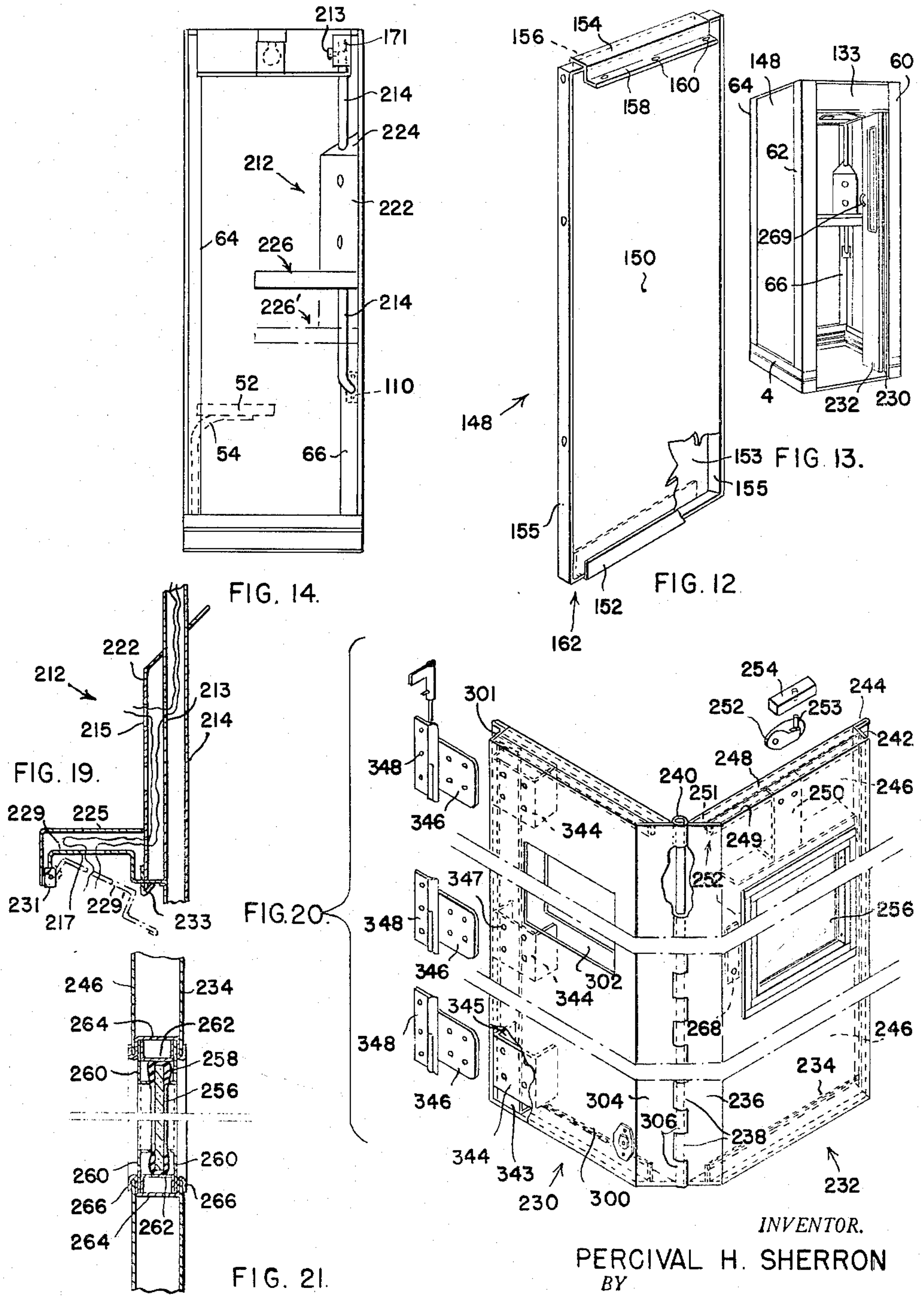
Figure 12 is a perspective view of a wall panel assembly.
Figure 13 is a perspective view of a completely assembled telephone booth.
Figure 14 is a diagrammatic showing of the interior of an assembled telephone booth.
Figure 19 is a vertical section taken through a portion of the telephone instrument mounting means.
Figure 20 is a perspective view showing, partially disassembled, the door assembly.
Figure 21 is a vertical section taken through a portion of the door assembly showing the mounting of a door window.

A phone backboard stand is shown generally at 212 in Figures 14, 18 and 19. This stand includes a tubular supporting member 214 the upper end of which is adapted to pass through the bore 172 in the ceiling pan and to be retained back of the bracket 171 by a bolt 213 passing through a slot in the bracket 171 and threaded into a tapped bore in the tubular member 214, as indicated schematically in Figure 14. The tubular member 214 is curved along its lower portion as shown at 216 and is provided at its lower end with a latch strip 218 which is adapted to pass through a bore 219 in the corner post and in the reinforcing pad 110 affixed to the outside surface of the corner post as shown in Figure 8. Thus the lower end of the tubular support 214 is supported in the position indicated in Figure 14.

A bracket member 220 having a recessed portion 221 adapted to engage the tubular member 214 is affixed to the member 214 by welding or other suitable means and is adapted to support a plate 222. Extending diagonally upwardly from the upper edge of the plate 222 is a triangular plate 224. The width of the plate 222 is such that when the plate is attached to the bracket 220 on the support 214, as shown in Figure 14, the vertically extending edges of the plate 222 are adapted to engage the adjacent walls of the booth. The upwardly inclined triangular member 224 provides a closure for the top of the space behind the plate 222. The plate 222 is adapted to mount the telephone which is to be installed within the booth.

Attached to the lower end of the plate 222 is a shelf assembly generally indicated at 226 in Figure 18. The side edges 227 of the shelf assembly are adapted to engage the sides of the booth. The top surface 225 of the shelf assembly provides a convenient resting place for change or other articles belonging to the user of the telephone. The undersurface of the shelf assembly includes a bell box mounting bracket 229 which is hinged to the lower portion of the front of the shelf assembly as indicated at 231. The inward portion of the bracket is held upwardly in normal position by a latch arrangement 233. The telephone bell box not shown in the figure, is adapted to be attached to the undersurface of the bracket. The telephone wiring passes downwardly through the support post 214 from the booth ceiling structure and out of the support post 214 through a bore 213 and downwardly back of the plate 222 and through the bore 217 in the bell box mounting bracket. Wiring from the bell box to the telephone passes upwardly through the bore 217 in the bell box mounting bracket and through the bore 215 in the plate 222. Access to the bell box may be obtained by releasing the latch 233 and hinging the bell box bracket downwardly and forwardly in the direction indicated by the position of the displaced bracket 229′ shown in construction lines. It will be apparent that, in the wiring of the bell box, sufficient slack wire will be provided within the shelf assembly to permit lowering of the bracket without requiring disconnection of the wiring.

The plate 222 is provided with a plurality of bores 228 and 228′ whereby the plate may be mounted to the bracket member 220. By employing either the upper bores 228 or the lower bores 228′ to effect this mounting, the telephone may be positioned for use with the user being in either a standing or a sitting position. If the lowermost mounting bores 228′ are used, the phone will be in an upper position and be in a convenient position for a standing user, whereas if the uppermost bores 228 are employed, the phone will be in a lower position. The two alternate positions are indicated as alternate relative positions of the shelf assembly in Figure 14 and indicated by the numerals 226 and 226′. If the phone backboard assembly is placed in the lowermost position as indicated by the numeral 226′, the seat assembly 52—54, which is also indicated in construction lines in Figure 14, will be additionally provided.

The inner post shown in Figure 9 has been described as an inner front right-hand post assembly. This post assembly is adapted to support the booth door assembly. The booth door assembly is shown in Figure 20 and comprises two door sections hinged together and indicated generally by the numerals 230 and 232. Each of these doors is of one piece construction. The door 232 is made from a sheet of metal formed to provide an inner panel 234 and a vertically extending panel 236 formed at an angle thereto on the left-hand side of panel 234, as viewed in Figure 20, and provided with extending portions 238 along its left-hand edge which are formed to engage a vertically extending hinge post 240. The door panel 234 is formed at its right-hand edge, as viewed in Figure 20, to provide the door edge 242 at right angles to the panel 234. The sheet of metal is then formed by means of a dutch bend 244 to extend perpendicularly outwardly of the door edge 242 and then inwardly to provide the outer panel 246 of the door. The top of the outer door panel 246 is formed with a strip of metal 248 extending horizontally toward the inner door panel 234. The top of the inner door panel 234 is formed with a strip of metal 249 extending horizontally toward the outer door panel 246. These two strips of metal 248 and 249 are each provided with a downwardly extending flange 251. The flanges 251 are in engagement with each other and the strips 248 and 249 provide a closure for the top of the door. The construction of the bottom edge of the door is the same as that of the top edge.

The door indicated by the numeral 230 is formed similarly to the door 232 and includes an inner panel 300 and an outer panel 302. A panel 304 is formed at an angle to the inner panel 300 and is provided with extending portions 306 along its right-hand edge which are formed to engage the vertically extending hinge post 240 between the extending portions 238 of the panel 236 of the door 232. Three channel shaped reinforcing members 344 are attached in spaced relation one above the other to the left-hand side of the interior surface of the inner door panel 300. The legs of the channel members 344 extend back and contact the panel 302 and the legs 345 of the channel members are in engagement with the vertically extending door edge 301. The channel members contain bores in alignment with bores 347 in the panel and are adapted to mount the door hinge leaves 346. A vertically extending strap 343 is attached to the channel members and serves to further reinforce the door hinge mounting. The other leaf 348 of each of the hinges is adapted to be bolted through the corner post to the reinforcing strip 142 shown in Figure 19.

The door 232 is provided with a reinforcing bracket 250 which is attached to the upper central portion of the interior face of the inner panel 234. The bracket is adapted to mount a block 252. A pin 253 is affixed to the block, extends upwardly therefrom, and is adapted to fit into a bore within a guide block 254. The block 254 is shaped to fit within the upper door track 201 supported from the lintel 133 and shown in Figure 11.

A door window assembly is mounted in each of the doors. The door 232 is shown with a window assembly installed and the door 230 is shown with the window assembly removed. Each of the door window assemblies includes a glass panel 256 which is mounted in a rubber frame 258. The sides of the rubber framing 258 are supported between inwardly turned angle members 260. The outer edges of the rubber framing 258 rest upon and the outer flanges of the angle members 260 are separated by channel members 262. The legs of the channel members 262 and the outer edges of the angles 260 are retained in and supported by channel members 264. The flanges of the channel members 264 are turned outwardly and back over the outside faces of the door panels 234 and 246, as indicated at 266, thereby retaining the channels 264 in position.

The door 232 is provided with a reinforcing plate 268 attached to the inside surface of the inside door panel 234 in order to mount a handle, not shown, which may be grasped by the user of the booth in order to open or close the door assembly.

The door assembly is hinged from the right front corner post 60 of the booth, as shown in Figure 13, by means of the booth door hinges the leaves 348 of which are bolted to the inside surface of the corner post through the reinforcing strip 142. The door edge 301 is adapted to engage the flat edge of the adjacent post produced by the flange 124 of the outer corner post. The door opens by hinging about the hinges affixed to the corner post and by folding about the hinge 240 between the two door panels with the hinge joint moving inwardly into the booth in the conventional fashion when the door is opened. The guide block 254 running in the overhead track 201 serves to position the door 232. When the door assembly is opened, the doors 230 and 232 are folded against each other and are inside of the booth as shown in Figure 13. When the door assembly is in a closed position, the doors 230 and 232 extend across the door opening below the lintel and the door edge 242 of the door 232 will be in engagement with the flat surface 124 of the adjacent outer corner post.

Figure 22:
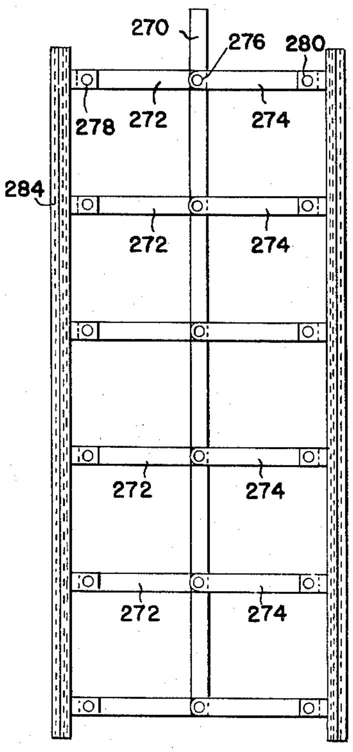
Figure 22 is an elevation of apparatus for joining two booths together.

In Figures 22 and 23 there is shown clamping apparatus for joining two booths together which includes a vertically extending strap of metal 270 to which there are pivotally attached, at a plurality of vertically spaced locations, individual outwardly and oppositely extending straps 272 and 274 by means of pivot pins 276 passing through the straps 272, 274 and the vertical strap 270. The outer ends of each of the straps 272 are pivotally connected by means of pins 278 to pairs of vertically extending angles 282 which are joined together by a vertically extending hat section member 284 having channel formed flanges 286 adapted to engage the outer ends of the angles 282. The outer ends of the straps 274 are pivotally connected at 280 to angles 283 which are formed by a hat section member 285 identical to the arrangement of the angles 282 and hat section member 284. The angles 282 and 283 and the hat section members 284 and 285 extend vertically the height of a booth.

When two booths are positioned adjacent to each other, the clamping apparatus is placed between the booths with the hat section members 284 and 285 and the channel formed extensions thereof outside of the space between the two booths and adapted to engage the front faces of the adjacent front posts of the two booths and the rear faces of the adjacent rear posts of the two booths.

The strap 270 is then drawn upwardly pivoting the horizontal straps 272 and 274 at their respective pivots 276, 278 and 280 and the vertically extending members 284 and 285 are drawn together clamping the two booths into position with respect to each other. When the strap 270 has been pulled upwardly to the limit of its travel and two booths have been clamped together, the upper end of the strap 270 may be bent over on top of the adjacent side panel of one of the two booths to prevent the strap from moving downwardly. The clamp arrangement is thereby held in firm engagement with the two booths and the two booths are held in alignment with the space between the two booths closed off. The apparatus thus also serves to close off in an attractive manner the undesirable space between the two booths.

It will be evident that, if the booth structure described is used outdoors, it will be desirable to add to the top of the booth a suitable sloping roof in order to protect the top of the booth from rain and it is also desirable to provide transparent glass panels in place of sound deadening side and rear panels 148. In an outdoor installation the sound deadening insert in the base assembly may be omitted and desirably an inclined inner floor structure would be used to provide drainage in the event that rain should be blown into the booth through the door cracks.

When a sloping roof is provided, the ceiling cover plate 194 may be omitted if desired. The roof structure may be held in place by clip plates which are held in position by the bolts 198 shown in Figure 11 which attach the ceiling pan assembly to the side panel flanges. It is noted that the ceiling cover plate 194 may, when employed, be similarly attached if desired.

It will be evident that these and various other modifications may be made in the embodiment of the invention disclosed herein without departing from the scope of the invention as set forth in the following claims.

What is claimed is:

1. In a telephone booth, corner posts, panels framed into said corner posts and providing conjointly with said posts the several side walls of the booth, and a base structure including upper and lower rigid frame members disposed in mutually overlying relation, a solid member made of sound vibration absorbing material and interposed between said frame members, said frame and vibration absorbing members conjointly forming upright walls extending peripherally about said booth, each of said frame and vibration absorbing members extending continuously across the back and sides and around all four corners of the booth, the several side walls and posts of the booth being mounted directly upon said upper frame member, the longitudinally extending upper and lower marginal areas of said vibration absorbing member being lodged respectively in opposed recesses respectively in said frame members and being of a size for maintaining said frame members in vertically spaced relation to one another, the load of the several side walls and posts and upper frame member being transmitted to said lower frame member through said vibration absorbing member.

2. A base structure for a telephone booth as defined in claim 1 wherein each of the frame members is a one-piece sheet metal member uniform in transverse section provided with an upright wall area extending longitudinally thereof, a marginal area extending inwardly from said upright wall area and forming a horizontally disposed longitudinally extending flange, and a second marginal area of U-shape in transverse section extending inwardly from said upright wall area in vertically spaced relation to said flange and disposed with the open face thereof turned away from said flange.

References Cited in the file of this patent

UNITED STATES PATENTS

| | | |
|---|---|---|
| 1,350,349 | Walther | Aug. 24, 1920 |
| 1,491,198 | Cassidy | Apr. 22, 1924 |
| 1,857,913 | Judelson | May 10, 1932 |
| 1,990,259 | Walters | Feb. 5, 1935 |
| 2,260,657 | Bohnsack | Oct. 28, 1941 |
| 2,272,639 | Jack | Feb. 10, 1942 |
| 2,584,626 | Sherron | Feb. 5, 1952 |
| 2,614,664 | Sherron | Oct. 21, 1952 |

FOREIGN PATENTS

| | | |
|---|---|---|
| 103,502 | Australia | Mar. 17, 1938 |